United States Patent [19]

Beckner et al.

[11] Patent Number: 6,091,354
[45] Date of Patent: Jul. 18, 2000

[54] GROUND PENETRATING RADAR WITH SYNTHESIZED END-FIRE ARRAY

[75] Inventors: Frederick L. Beckner; Jeffrey Alan Oicles, both of Palo Alto; Stephen James Davis, Hayward, all of Calif.

[73] Assignee: Power Spectra, Inc., Sunnyvale, Calif.

[21] Appl. No.: 09/379,685

[22] Filed: Aug. 24, 1999

Related U.S. Application Data

[63] Continuation of application No. 09/064,948, Apr. 23, 1998, abandoned.

[51] Int. Cl.[7] ............................................. G01S 13/88
[52] U.S. Cl. .................................................... 342/22
[58] Field of Search ....................................... 342/22

[56] References Cited

U.S. PATENT DOCUMENTS

| | | | |
|---|---|---|---|
| 3,775,765 | 11/1973 | Di Piazza et al. | 342/22 |
| 4,167,736 | 9/1979 | Tomlinson | 342/22 |
| 5,327,139 | 7/1994 | Johnson | 342/22 |
| 5,680,048 | 10/1997 | Wollny | 342/22 |

*Primary Examiner*—Daniel T. Pihulic
*Attorney, Agent, or Firm*—Burns, Doane, Swecker & Mathis, L.L.P.

[57] ABSTRACT

In a ground penetrating radar system, A-scan images of subsurface targets lying along the antenna boresight axis can be substantially improved and generated in real-time by employing a synthetic aperture, end-fire array, despite the inhomogeneous nature of the subsurface volume. The synthetic aperture, end-fire array is achieved by generating electro-magnetic (EM) ultra-wideband impulses at a number of precise locations along the antenna boresight access, shifting the returned EM signals in the time domain according to the corresponding antenna boresight location, and then integrating the shifted, returned EM signals.

23 Claims, 7 Drawing Sheets

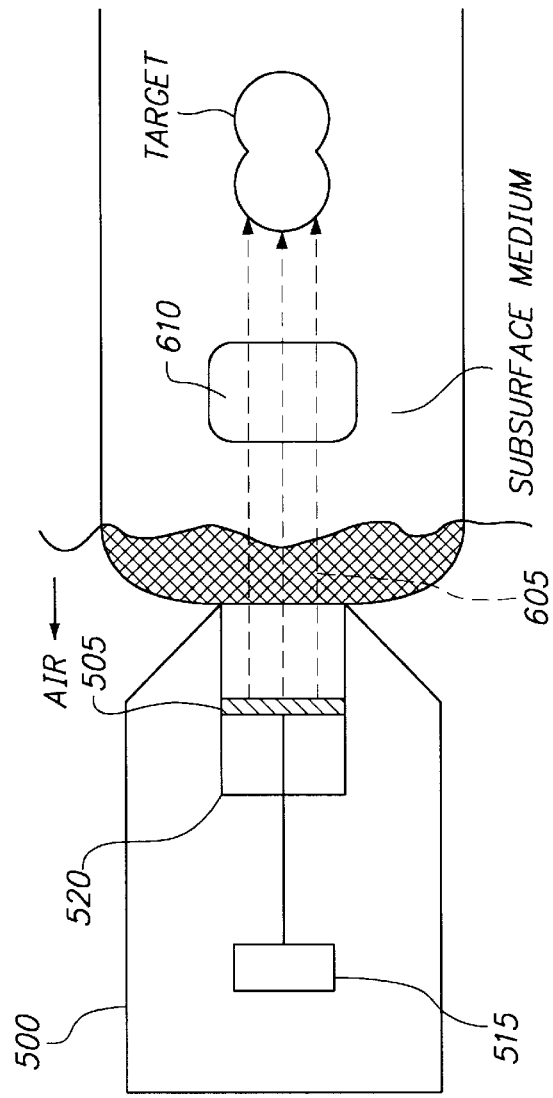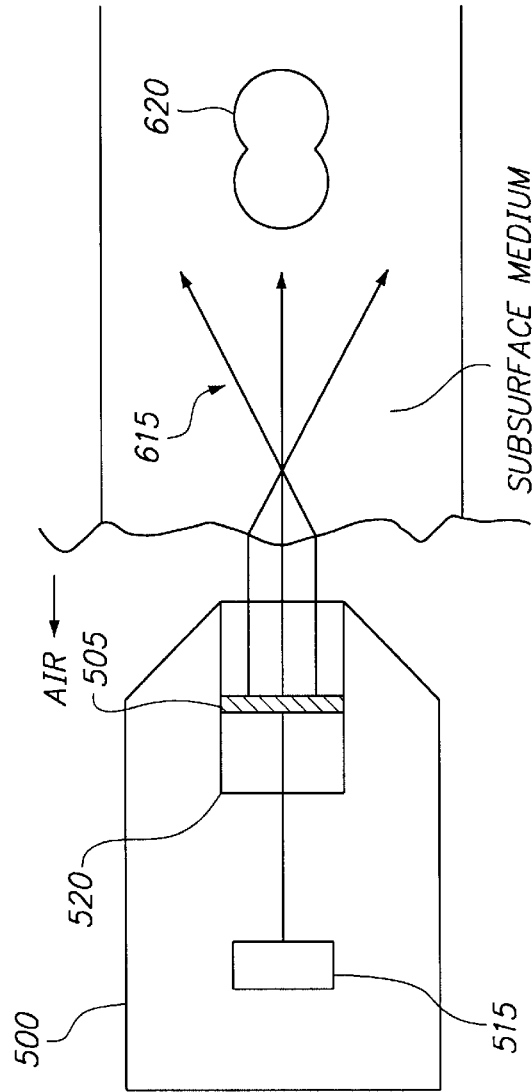

GROUND PENETRATING RADAR WITH SYNTHESIZED END-FIRE ARRAY

This application is a continuation of application Ser. No. 09/064,948, filed Apr. 23, 1998 now abandoned.

CROSS REFERENCE TO CO-PENDING APPLICATIONS

This application is related to patent application Ser. No. 08/861,817, U.S. Pat. No. 5,912,639 filed May 23, 1997.

BACKGROUND

The present invention relates to time of flight (TOF) measurement systems. More particularly, the present invention relates to a ground penetrating radar (GPR) system that is capable of providing A-scan images of subsurface targets using a synthetic aperture, end-fire array.

In the past, GPR has been used for a number of diverse applications, for example, geophysical applications such as mapping subsurface strata; locating toxic waste sites for remediation; and detection and location of unexploded subsurface ordnance.

GPR systems are similar to ordinary radar systems in that both measure target range (i.e., the distance from the radar system to an intended target, or portion thereof) by determining the amount of time it takes for electromagnetic (EM) radiation to travel from the radar to the intended target and then back to the radar. In practice, however, conventional GPR systems are inherently more complicated than ordinary radar systems due to some unique problems associated with transmitting and receiving EM radiation through a subsurface medium.

The first problem is that the subsurface medium (e.g., the earth) is typically inhomogeneous. Therefore, the EM radiation in a GPR system must travel through a number of different media, for example, air, rock, sand, water, clay, and other types of subsurface mineral deposits, each with a different and unquantified dielectric constant. Hence, the propagation velocity of the EM radiation from point to point within the subsurface volume may vary dramatically and is typically unknown without first performing a detailed, time-consuming analysis of the subsurface volume.

Ordinary radars do not encounter this problem because they transmit and receive EM radiation through "free space" (i.e., air) which is a homogeneous medium with a known dielectric constant. Because the dielectric constant of air is known, the propagation velocity of the EM radiation traveling through the air is known. Therefore, the computation of target range is quickly reduced to the task of multiplying the EM radiation time-of-flight (i.e., the round trip travel time between the radar and the target) by the propagation velocity of EM radiation through air.

The second problem associated with conventional GPR is that EM radiation does not penetrate the earth as easily as it penetrates the air. In fact, some media, such as wet clay or salt water, are so absorbent that EM radiation, at the frequency ranges relevant to GPR, cannot penetrate more than a few inches. The ability to penetrate a subsurface medium is highly dependent upon the frequency of the EM radiation. More specifically, low frequencies tend to achieve greater subsurface penetration. Unfortunately, lower frequencies also result in decreased target range resolution (i.e., target range accuracy). However, range resolution is also dependent upon bandwidth. More recently, GPR systems have begun employing ultra-wideband techniques, especially ultra-wideband impulse techniques which, to some extent, improve a GPR's ability to penetrate a subsurface medium without sacrificing resolution.

Although the two above-identified problems are by no means the only problems that affect GPR performance, they are clearly two very significant problems. Regarding the problem of subsurface inhomogeneity, some GPR systems employ a brute force technique that involves determining the propagation velocities for each region in the subsurface volume. However, as one might expect, these systems tend to be unacceptably slow. Consequently, there is a need to produce a GPR system that, despite the above-identified problems, can produce a subsurface image in real or near real-time. Moreover, there is a need to provide such a system that is physically compact so that it can be utilized in a spatially limited area.

SUMMARY

The present invention involves an ultra-wideband impulse ground penetrating radar (GPR) system that employs a synthetic aperture, end-fire array. The synthetic aperture, end-fire array technique characteristically produces a very narrow beam without the need to determine the propagation velocities throughout the subsurface volume. In addition, the narrow beam significantly improves the signal-to-clutter ratio, which in turn, improves the ability of the radar to penetrate the subsurface volume.

It is, therefore, an object of the present invention to provide a GPR system that is capable of detecting subsurface objects such as mineral ore bodies and other subsurface structures.

It is another object of the present invention to provide a GPR system that can generate a real-time or near real-time A-scan image of subsurface objects despite several significant problems associated with propagating EM radiation through an unknown, inhomogeneous subsurface medium.

It is yet another object of the present invention to provide a GPR system that is capable of detecting, locating and identifying subsurface ore bodies from an area that is spatially constrained, for example, an underground mine shaft.

In accordance with one aspect of the present invention, the aforementioned and other objects are achieved with a radar system that includes an antenna assembly and an antenna chamber, wherein the antenna assembly is contained within the antenna chamber. The radar system also includes a fluid, wherein the fluid is contained in the antenna chamber such that the antenna assembly is immersed in the fluid.

In accordance with another aspect of the present invention, the aforementioned and other objects are achieved by an apparatus for transmitting and receiving ground penetrating radar signals into and out of a subsurface medium. The apparatus includes antenna means for transmitting and receiving radio frequency energy at a plurality of points along a boresight axis, and antenna repositioning means for translating the antenna means to each of the plurality of points along the boresight axis. The apparatus also includes means for keeping the antenna means immersed in a fluid as the antenna means transmits and receives radio frequency energy at each of the plurality of points along the boresight axis.

In accordance with another aspect of the present invention, the aforementioned and other objects are achieved by an apparatus for transmitting and receiving ground penetrating radar signals into and out of a subsurface medium. The apparatus includes antenna means for transmitting and receiving radio frequency energy at a plurality of points along a boresight axis, and antenna repositioning means for translating said antenna means to each of the plurality of points along the boresight axis. The apparatus also includes means for displacing air located between said antenna means and the subsurface medium, as said antenna means transmits and receives radio frequency energy at each of the plurality of points along the boresight axis.

In accordance with another aspect of the present invention, the aforementioned and other objects are achieved by a method for illuminating potential subsurface targets embedded in a subsurface medium. The method involves immersing an antenna in a fluid, wherein the fluid has a dielectric constant that is equal or substantially equal to a dielectric constant associated with the subsurface medium, and translating the antenna to each of a plurality of points along a boresight axis of the antenna, wherein the antenna remains immersed in the fluid. The method also involves transmitting and receiving radio frequency energy at the plurality of points along the boresight axis, wherein the radio frequency energy is transmitted from the antenna into the fluid and then into the subsurface medium, and wherein the radio frequency energy is reflected by the target, if one exists, through the subsurface medium and into the fluid.

BRIEF DESCRIPTION OF THE DRAWINGS

The objects and advantages of the invention will be understood by reading the following detailed description in conjunction with the drawings in which:

FIGS. 6A–D illustrate another alternative embodiment of the synthetic aperture, end-fire array ground penetrating radar.

DETAILED DESCRIPTION

The present invention is an ultra-wideband (UWB), ground penetrating radar (GPR) system that overcomes the above-identified problem of propagating electromagnetic (EM) radiation through an inhomogeneous medium. The present invention overcomes this problem by employing a synthetic aperture, end-fire array, which is implemented by translating the radar antenna in free space and along the antenna boresight where the dielectric constant and, hence, the propagation velocity of EM radiation is well known.

Although only preferred embodiments are specifically illustrated and described herein, one skilled in the art will appreciate that many modifications and variations of the present invention are possible and within the purview of the appended claims without departing from the spirit and intended scope of the invention. For example, the embodiments described below primarily involve an UWB, impulse generating GPR. However, one skilled in the art will recognize that other types of GPR could form the basis of alternative embodiments of the present invention. Other types of UWB GPR include linear FM GPR (i.e., swept frequency GPR) and stepped frequency GPR.

Figure 1:
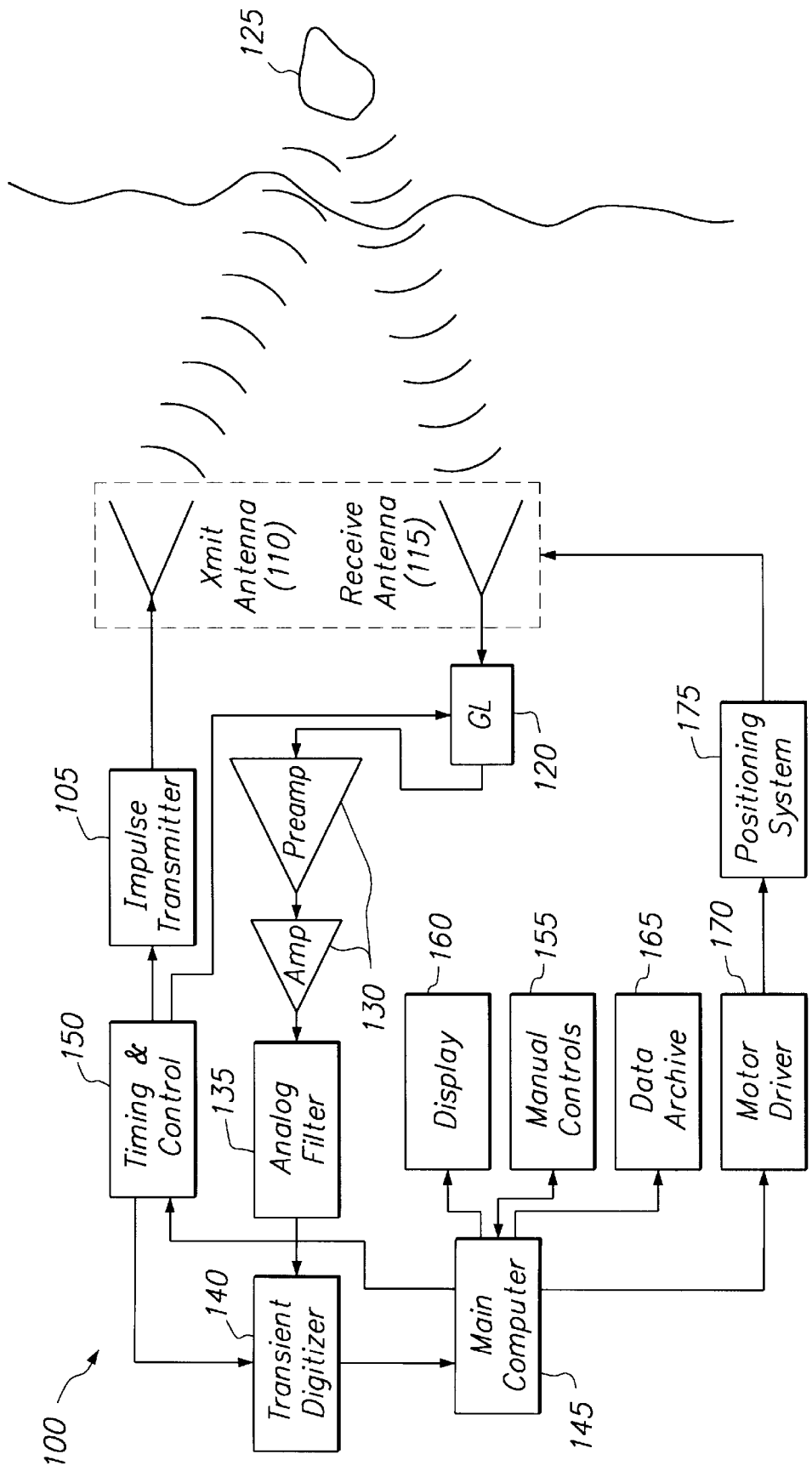
FIG. 1 is a block diagram of the present invention.

FIG. 1 shows a block diagram of an exemplary embodiment of the present invention 100. According to FIG. 1, the EM radiation is generated by an impulse transmitter 105. The impulse transmitter 105 emits UWB impulses that approximate differentiated monocycles, wherein each impulse comprises two short positive-going pulses with an intermediary negative excursion. In addition, each UWB impulse reflects a bandwidth of greater than 100 percent, which enhances target range resolution, as is well known in the art.

The exemplary embodiment illustrated in FIG. 1 also includes separate, but co-located, transmit and receive antennas 110 and 115 respectively. This antenna configuration is commonly referred to as a "bistatic" configuration. Those skilled in the art, however, will recognize that similar functionality can be achieved with a single antenna (i.e., a monostatic configuration). Connected to the receive antenna 115 is a high speed gate limiter (GL) switch 120. In a preferred embodiment, the GL switch is a high speed, gallium arsenide-based switch. This high speed switch prevents the receiver from saturating or clipping due to large, cross-fed (i.e., "leakage") signals that propagate from the transmitter antenna 110 directly into the receive antenna 115 without first penetrating or reflecting from the ground. The large, initial pulse caused by the cross-fed signals is undesirable and it is important that it be suppressed.

After the EM radiation energy reflecting back from the intended target 125 has been received, it is processed by a number of electronic devices including one or more amplifiers 130, an analog filter 135, and a transient digitizer 140. The amplifiers 130 increase the amplitude of the EM radiation energy return signal. In a preferred embodiment, the amplifier gain levels increase over time to compensate for the attenuation of the EM radiation energy return signal which increases as the range to the intended target 125 increases. The analog filter 135 removes DC offsets from the EM radiation energy signal before the signal is digitized. This, of course, is necessary in order to accurately integrate the EM radiation energy return signal with other EM radiation energy return signals. Once filtered, the EM radiation energy signal is digitized by a transient digitizer 140, so that the signal can be processed by the signal processing algorithms resident in the main computer 145.

The main computer 145 issues control signals for a timing and control circuit 150, which in turn controls the timing of the impulse transmitter 105 and the GL switch 120. The main computer 145 also issues control signals for the motor driver 170 and the positioning system 175 which translate the antennas 110 and 115 along the boresight axis, as will be described in greater detail below. The main computer 145 also accepts manual control inputs, as illustrated by block 155, and outputs images and/or status information to a display unit 160. Finally, the main computer 145 is capable of archiving data (e.g., storing image and/or status information in memory), as illustrated by block 165.

As stated, the present invention employs a synthetic aperture, end-fire array, which produces an effectively narrow antenna beamwidth. As those skilled in the art will recognize, a narrower antenna beamwidth typically results in greater signal-to-clutter ratios. The synthetic aperture, end-fire array technique also facilitates the process of coherently integrating the digitized signals which represent the EM radiation energy received from intended targets, and it facilitates decorrelating the digitized signals which represent the EM radiation energy received from unintended objects and/or clutter. By improving the coherent integration of target data and the decorrelation of unintended objects and/or clutter, the present invention is able to provide a clear measure of subsurface target location. Finally, the synthetic aperture, end-fire array facilitates the collection of EM radiation in a confined space by eliminating any need to utilize a multiple antenna array.

Figure 2:
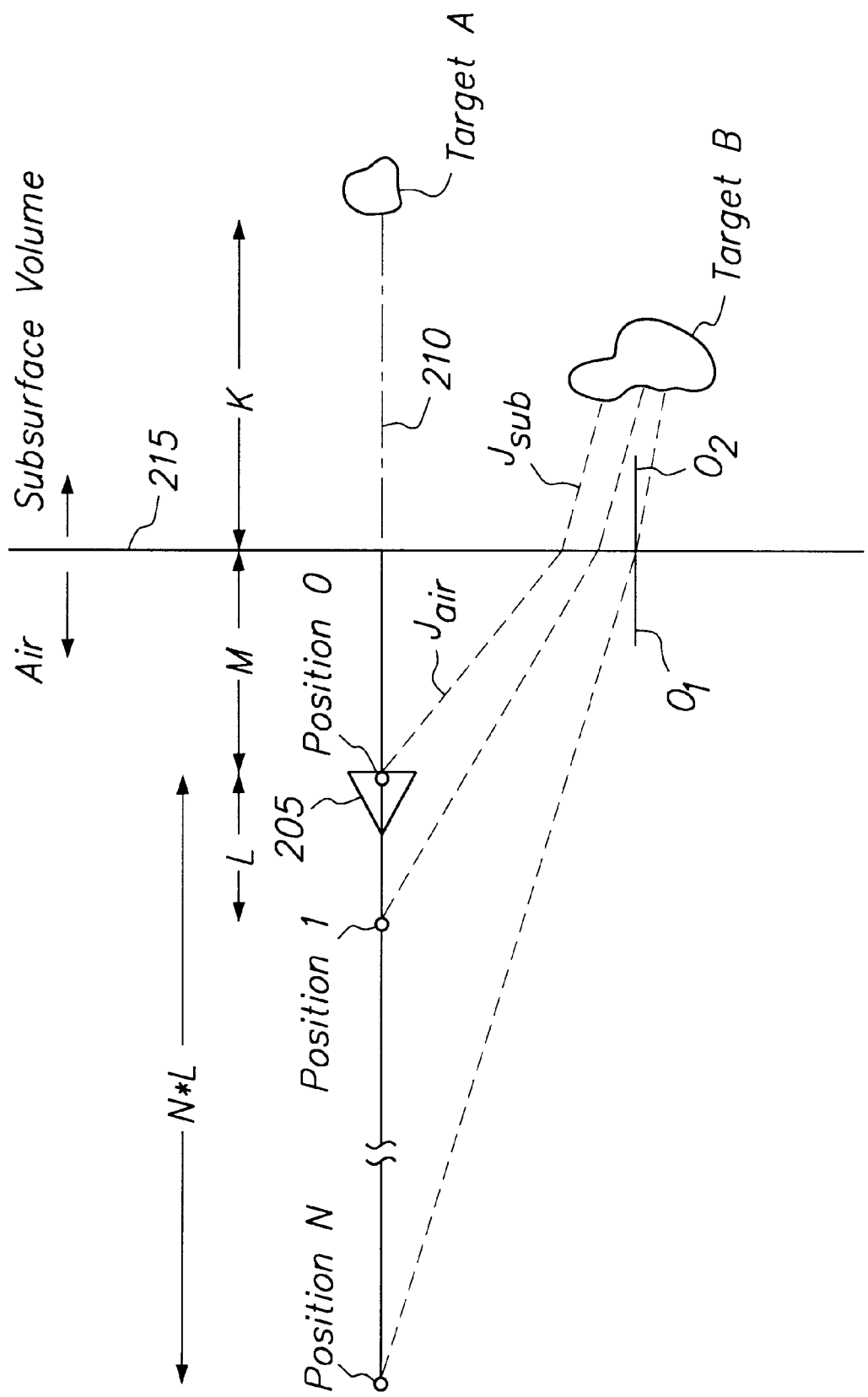
FIG. 2 is a diagram illustrating the synthetic aperture, end-fire array technique.

FIG. 2 illustrates the synthetic aperture, end-fire array technique. In accordance with an exemplary embodiment of the present invention, the radar sensor 205 (i.e., the radar antenna) is first located at a position 0 where it emits multiple ultra-wideband (UWB) impulses along the antenna boresight 210 in the direction of an intended target A. The EM radiation energy stored in the UWB impulses travels forward through free space (i.e., air), penetrates the air/subsurface volume interface 215, which is essentially perpendicular to the antenna boresight 210, propagates through the subsurface volume, intercepts both on-boresight targets (e.g., target A) and off-boresight objects (e.g., object B), and then reflects back towards the radar sensor 205. After the EM radiation energy associated with each UWB impulse is received, amplified, and digitized, the digital signals representing each of the received UWB impulses are integrated by signal processing algorithms residing in and executed by the main computer 145.

The radar sensor 205 is then translated along the antenna boresight 210 to a position 1 which is precisely located a distance L from position 0. At position 1, the radar sensor 205 once again emits multiple UWB impulses in the direction of the intended target A. As FIG. 2 illustrates, the EM radiation energy associated with the UWB impulses emitted at position 1 and traveling along the antenna boresight 210 must travel an additional distance of 2*L as compared with the EM radiation energy associated with the UWB impulses emitted at position 0. It is important to note that the on-boresight, subsurface distance K remains the same, with respect to position 0 and position 1. The on-boresight air path, M plus n*L, varies only by the distance L as the antenna is moved from position 0 to position 1, wherein n represents the antenna position and equals 0 . . . N. The off-boresight subsurface path $J_{sub}$ and the off-boresight air path $J_{air}$ also vary as the antenna is moved. The total off-boresight path length $J_{sub}$ plus $J_{air}$ changes by less than L as the antenna is moved from position 0 to position 1. The farther off-axis target B is, the less the off-boresight path length changes as the antenna is moved.

It is also important to note that the off-boresight EM radiation changes direction, in accordance with Snell's Law, when it penetrates the air/subsurface volume interface 215, as illustrated in FIG. 2. For example, if the angle of incidence $\theta_1$ is 30 degrees, the angle $\theta_2$ is determined by the following relationship:

$$\theta_2 = \arcsin(\sin 30°/\eta) \qquad (1)$$

wherein $\eta$ is the index of refraction. Depending upon the soil, $\eta$ will typically range from approximately 3 to approximately 9. As one skilled in the art will recognize, higher indices of refraction will result in smaller angular values for $\theta_2$, which further enhances the present invention's ability to decorrelate clutter and other signal returns due to off-boresight objects as will be explained in more detail below.

The digital signals representing the EM radiation energy received, while the radar sensor 205 is located at position 1, are then shifted in the time domain by the signal processing algorithms, and by an amount that is equivalent to the time required for EM radiation to propagate a distance of 2*L through free space (i.e., air). Once shifted, the digital signals representing the EM radiation energy received at position 1 and the digital signals representing the EM radiation energy received at position 0 will be aligned in the time domain (i.e., coherent) only with respect to EM radiation energy returns corresponding to targets lying along the antenna boresight 210. As will be explained below, the EM radiation energy returns that are associated with objects lying off-boresight will not be aligned as a result of the time-shift procedure. The digital signals representing the EM radiation energy received at position 1 are then integrated with the digital signals representing the EM radiation energy received at position 0. Accordingly, the digital signals representing the EM radiation energy associated with targets lying along the antenna boresight 210 will be coherently integrated (i.e., added) during the integration process while all other non-coherent returns will be decorrelated during the integration process.

More generally, the radar sensor 205 is translated to a number of positions 0 . . . N along the antenna boresight 210. At each position 0 . . . N, the digital signals representing the EM radiation energy returns are shifted in the time domain by an amount equivalent to the time required for EM propagating along the antenna boresight 210 to travel the additional round trip distance of 2*n*L, where n equals 0 . . . N. As stated above, the digital signals are then integrated by the signal processing algorithms in the main computer 145.

Figure 3A:
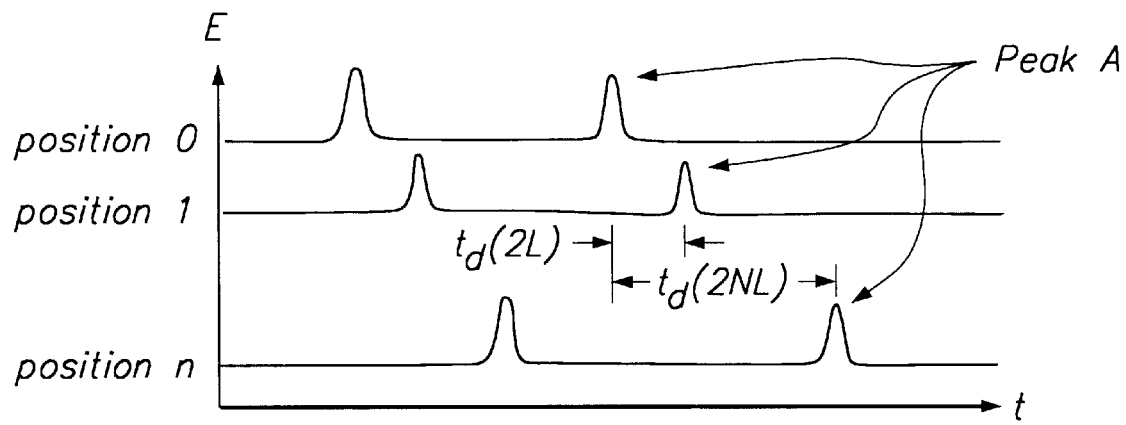
FIGS. 3A–C are timing diagrams which depict the shifting and integration of the radar returns.

FIG. 3A depicts three exemplary EM signal returns: a first corresponding to the EM signal received at position 0, a second corresponding to the EM signal received at position 1, and a third corresponding to the EM signal received at position N. For purposes of illustration, the signals in FIG. 3A are depicted as analog signals; however, one skilled in the art will readily understand that the signals would be digitized by the transient digitizer 140 prior to signal processing. In FIG. 3A, Peak A represents that portion of each EM signal associated with EM energy reflecting from target A, which lies along the antenna boresight 210. With respect to the EM signals corresponding to positions 1 and N, peak A is shifted in the time domain by an amount of time $t_d(2L)$ and $t_d(2NL)$ respectively, wherein the values of $t_d(2L)$ and $t_d(2NL)$ represent the amount of time that it will take the EM radiation propagating along the antenna boresight 210 to travel the additional distance of 2*L and 2*N*L respectively. As the additional distances traveled by the EM radiation occurs in free space, the additional time $t_d(2L)$ and $t_d(2NL)$ is computed by the signal processing algorithms in accordance with the following relationship:

$$t_d = (2*M*L)/c \qquad (2)$$

where L is the distance between successive positions 0 . . . N lying along the antenna boresight 210, c is the velocity of light in air, and M varies from 0 to N.

Figure 3B:
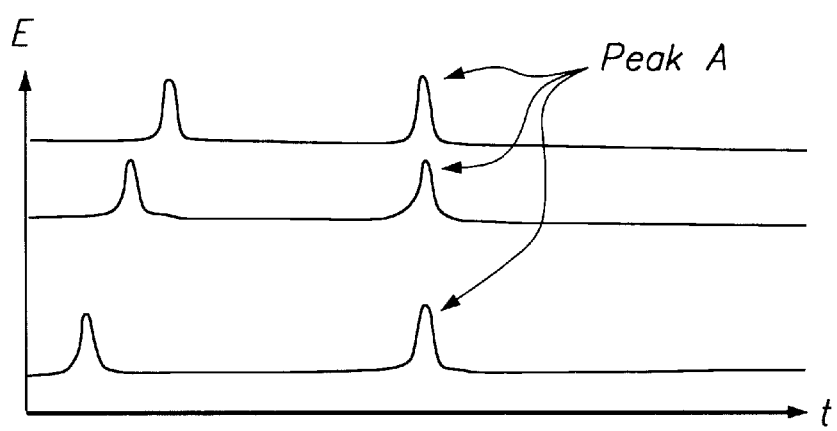

FIG. 3B illustrates the same three exemplary EM signals after being shifted based on the corresponding time delay $t_d(2L)$ and $t_d(2NL)$ respectively. Note, that by shifting the signals accordingly, peak A for each signal becomes aligned with respect to time. Conversely, those portions of the EM signals associated with reflections due to off-boresight objects (e.g., object B), do not align after the signals are shifted. That is because the distance traveled by the EM radiation propagating along a path other than the antenna boresight 210 (e.g., along a path that intercepts object B) will vary by an amount other than 2*N*L.

Figure 3C:
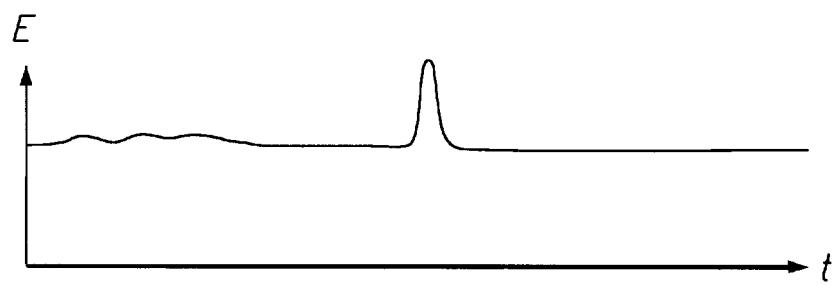

FIG. 3C illustrates the resultant signal after shifting the received EM signals and then integrating them with respect to position. More particularly, FIG. 3C, shows that the coherent EM energy returns, such as those corresponding to target A, will be added during the integration process. At the same time, the non-coherent returns, such as those corresponding to object B, will be decorrelated during the integration process by the signal processing algorithms.

As explained above, the air/subsurface volume interface 215 will cause the EM radiation line-of-sight to bend, in accordance with Snell's Law, upon penetrating the subsurface volume for all axes other than the antenna boresight 210. That is because the antenna boresight 210 is, as mentioned above, perpendicular to the air/subsurface volume interface 215 and because the dielectric constant for the subsurface volume is greater than the dielectric constant for air. This bending of the EM radiation line-of-sight, in turn, causes off-boresight objects (e.g., object B) to appear further from the antenna boresight 210 than they really are. The change in dielectric constant and the bending of the EM radiation effectively synthesizes a more narrow antenna bandwidth, which in turn enhances the decorrelation of EM radiation energy reflecting back from off-boresight objects.

Figure 4A:
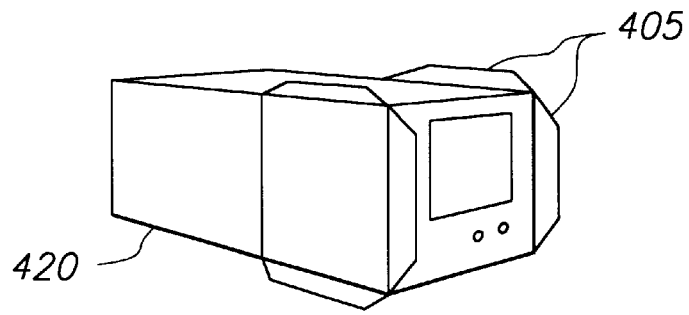
FIGS. 4A–D illustrate various exterior configurations of the present invention.
Figure 4B:
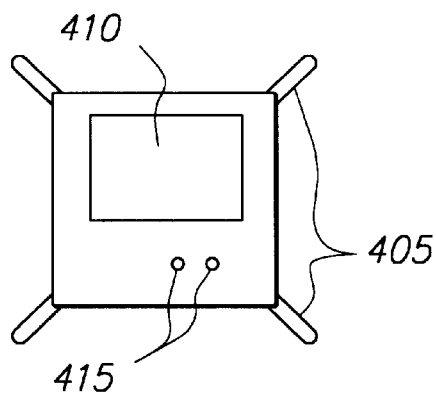

FIGS. 4A and 4B illustrate a perspective view and a front view of the exterior configuration of the present invention, in accordance with an exemplary embodiment. Together, these figures show that the exterior design includes a number of handles 405 which are used for manually lifting and positioning the radar, which is small enough and light enough that it can be lifted and placed in position by one person. The figures also show that the exterior design includes a built-in computer monitor 410 along with a number of standard controls 415 for adjusting the monitor display. On the distal end, the exterior design comprises a radome 420 which surrounds and protects the radar antenna. The near end houses all of the supporting electronic circuitry, such as the amplifiers 130, the analog filter 135, the transient digitizer 140, and the main computer 145.

Figure 4C:
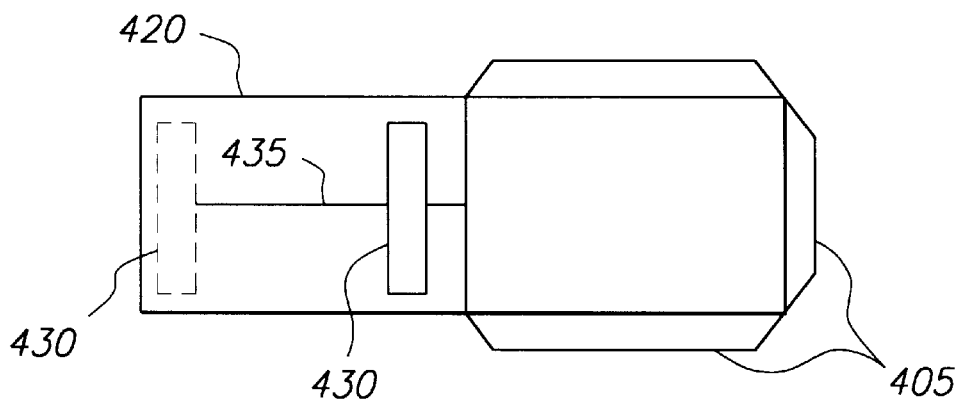

FIG. 4C shows a side view of the present invention, with the interior of the radome 420 exposed. As stated above, to implement the synthetic aperture, end-fire array technique, the radar antenna is translated along the antenna boresight. FIG. 4C shows that this is actually accomplished by translating the radar antenna 430 along a guide rail 435, wherein the guide rail 435 is coincident with the antenna boresight 210. A servo motor unit (not shown), housed in the near-end compartment, is used to move the radar antenna 430 along the guide rail 435.

Figure 4D:
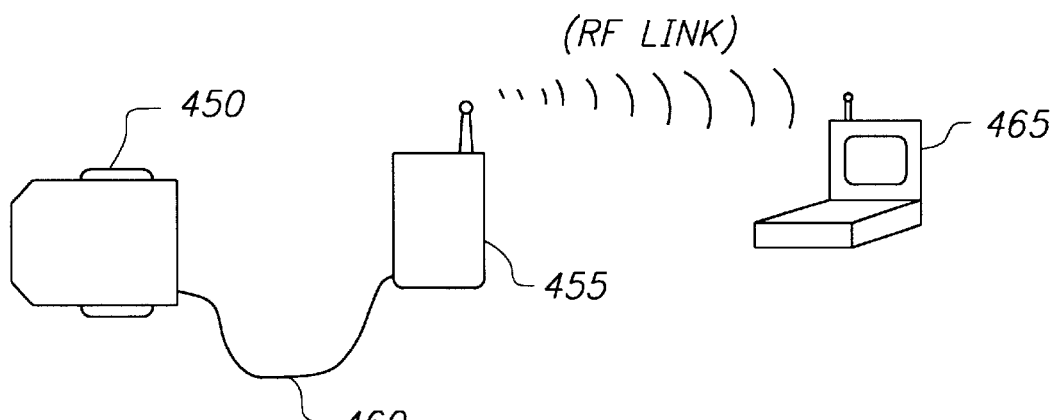

FIG. 4D presents an alternative exterior design configuration of the present invention. As shown, the sensor 450 is connected to a transmitter unit 455 by an umbilical cable 460, wherein the sensor contains, among other things, the antenna and the electronics required to translate the antenna along the antenna boresight axis to achieve the synthetic aperture end-fire array described above. The transmitter unit 455 contains, among other things, a battery, a high speed digitizer and a radio frequency modem. Preferably, the transmitter unit 455 is worn by or attaches to the user. The transmitter unit 455 then transmits the GPR data to a computer unit, such as the portable laptop computer 465, via a radio frequency link, as shown. The computer unit then displays the GPR data.

In an alternative embodiment, the synthetic aperture, end-fire antenna array described above is immersed in a fluid. In accordance with this alternative embodiment, the fluid in which the antenna array is immersed has a dielectric constant (i.e., a relative permittivity $\epsilon_r$) approximately equal to the dielectric constant of the subsurface medium in which a desired target is believed to be located. Accordingly, the fluid and the subsurface medium exhibit matching or near-matching impedances. For example, a fluid such as dimethyl phthalate would be appropriate if a desired target, such as gold, is embedded in a vein of native quartz rock, since the dielectric constant of native quartz rock is approximately 8.0 and the dielectric constant of dimethyl phthalate is approximately 8.5. In a second example, a fluid having a dielectric constant approximately equal to 3.0 would be desirable where the subsurface medium is sand. However, one skilled in the art will recognize that for a given subsurface medium there may be a number of different fluids that could be successfully employed.

Choosing a fluid that has a dielectric constant exactly equal to the dielectric constant of the subsurface medium would be preferable. Of course, it will be understood that identifying such a fluid may be difficult, if not impossible. Therefore, in accordance with this alternative embodiment, a fluid exhibiting a dielectric constant that is approximately equal or substantially equal to the dielectric constant of the subsurface medium should be sufficient, wherein a dielectric constant approximately equal or substantially equal to the dielectric constant of the subsurface medium refers to a dielectric constant that more closely approximates the dielectric constant of the subsurface medium as compared with the dielectric constant of air.

Figure 5:
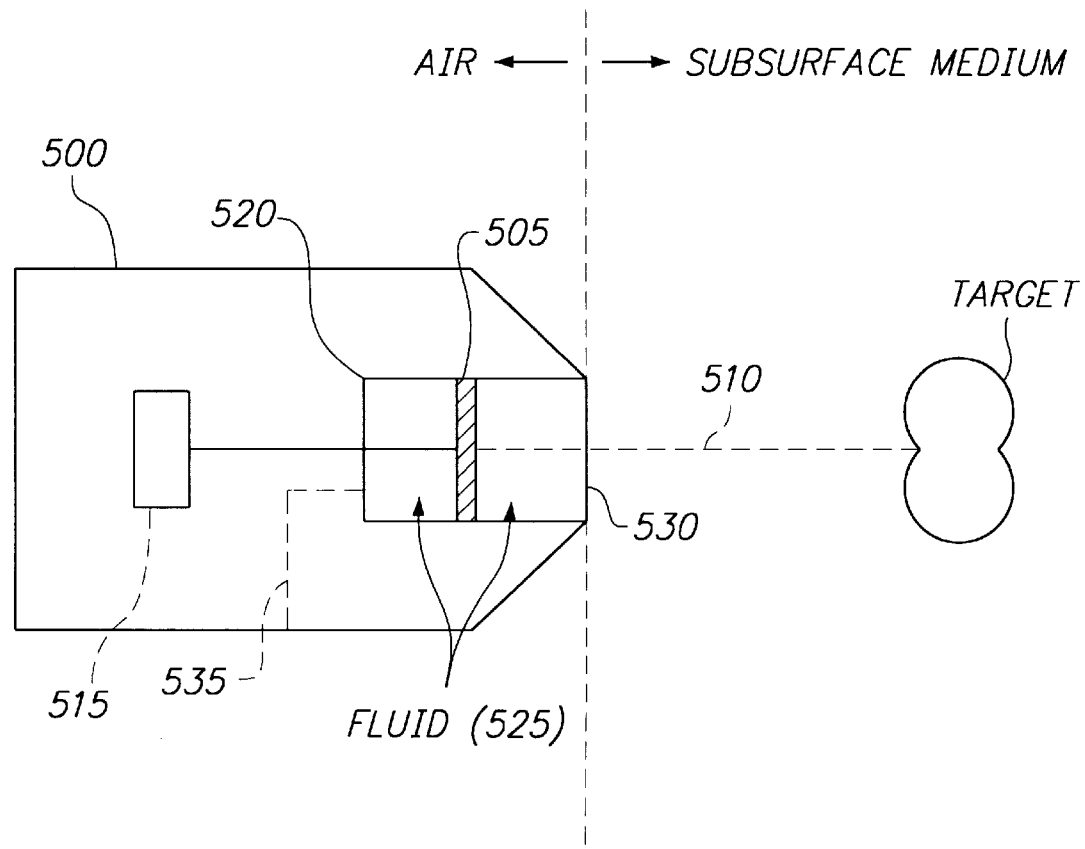
FIG. 5 illustrates an alternative embodiment of the synthetic aperture, end-fire array ground penetrating radar.

FIG. 5 illustrates a GPR unit 500 that includes, among other features, an antenna 505; a mechanism for translating the antenna along the antenna boresight 510, such as servo motor 515; a fluid-filled antenna chamber 520; and, of course, a fluid 525 having a dielectric constant equal or substantially equal to the subsurface medium. In accordance with the alternative embodiment illustrated in FIG. 5, radio frequency energy propagates from the antenna 505, into the fluid 525, through a fluid/subsurface medium interface 530 and into the subsurface medium. As there is an impedance match, or a near-impedance match, between the fluid 525 and the subsurface medium, there is little or no reflection of energy at the fluid/subsurface medium interface 530.

There are a number of advantages associated with this alternative embodiment. First, as there is little or no reflection of energy as the radio frequency energy passes back and forth across the fluid/subsurface medium interface 530, there is less energy loss. Less energy loss increases the effective power of the radio frequency energy needed to radiate the desired subsurface target. Second, the size of the antenna can be reduced by a factor of $\epsilon_r^{1/2}$ (i.e., the square root of the relative permittivity of the fluid 525). Third, the distance which the antenna 505 must be translated along boresight axis 510 to achieve the synthetic aperture, end-fire array described above may be reduced by the same factor. If the size of the antenna 505 and the distance that the antenna 505 must travel are reduced, so too is the overall size and weight of the GPR unit 505. This is especially important where the present invention is likely to be used in a physically constrained environment, such as a mineshaft.

FIG. 5 further illustrates that the GPR unit 500 may include the ability to drain and/or replace the fluid 525 with an alternative fluid, as represented by dashed line 535. This capability may be implemented by employing a drain, a pump or any equivalent mechanism. The purpose for this alternative is, of course, to permit the user to replace the fluid 525 with an alternative fluid that exhibits a different dielectric constant. This capability would be advantageous where the user expects to be propagating the radio frequency energy into different subsurface mediums, wherein the different subsurface mediums exhibit different dielectric constants.

FIGS. 6A–D illustrate another alternative embodiment of the present invention. In FIG. A, the GPR unit 500 includes a bladder 605. As shown, the bladder 605 is placed between the fluid-filled antenna chamber 520 and the subsurface medium. The bladder 605 is constructed out of a highly flexible material so the bladder 605 is capable of conforming to a rough or irregular surface contour. Preferably, the bladder 605 exhibits a dielectric constant equal to or substantially equal to the dielectric constant of the fluid 525 and the subsurface medium. Alternatively, the bladder 605 may be filled with a fluid that exhibits a dielectric constant equal to or substantially equal to the dielectric constant of the fluid 525 and the subsurface medium. It is also preferable that the bladder 605 be removable so that the GPR 500 can be employed both with and without the bladder 605.

By conforming to the rough or irregular surface contour, as shown in FIG. 6A, the bladder 605 displaces virtually all of the residual pockets of air that might otherwise occupy the space between the fluid-filled antenna chamber 520 and the rough surface. Consequently, the rough or irregular surface is effectively eliminated, and the radio frequency energy, represented by parallel rays 610, propagates from the bladder 605 into the subsurface medium without experiencing any significant refraction at the surface. By eliminating or minimizing refraction, energy losses are minimized and the effective power of the radio frequency energy is enhanced.

FIG. 6B further illustrates the advantages of the bladder 605 by showing how the rough or irregular surface can affect the radio frequency energy when the bladder 605 is not installed. Without the bladder 605, the radio frequency energy is refracted as it traverses the irregular (i.e., non-perpendicular) surface, in accordance with Snell's Law. This is undesirable because it diffuses the energy along the antenna boresight and reduces the amount of energy radiating the target 620.

Although GPR 500 in FIG. 6A includes the bladder 605 and the fluid-filled antenna chamber 520, it should be noted that the GPR 500 could be employed with the bladder 605 and without the fluid-filled antenna chamber 520. As long as the interface between the bladder 605 and the antenna assembly is perpendicular to the antenna boresight, the radio frequency energy traversing the interface will not be refracted, even if the dielectric constant of the bladder 605 and the antenna assembly medium differ. However, it is more desirable to employ the fluid-filled antenna chamber 520 and the bladder 605 together, wherein both exhibit equal or substantially equal dielectric constants, as this will minimize the amount of reflected energy as the energy passes back and forth across the interface between the antenna chamber 520 and the bladder 605. Less energy reflection results in less energy loss, and less energy loss increases the amount of energy available along the antenna boresight to radiate the desired target 620. Furthermore, reflected energy tends to wander from the antenna boresight in undesirable directions, creating clutter returns from undesirable targets.

Figure 6C:
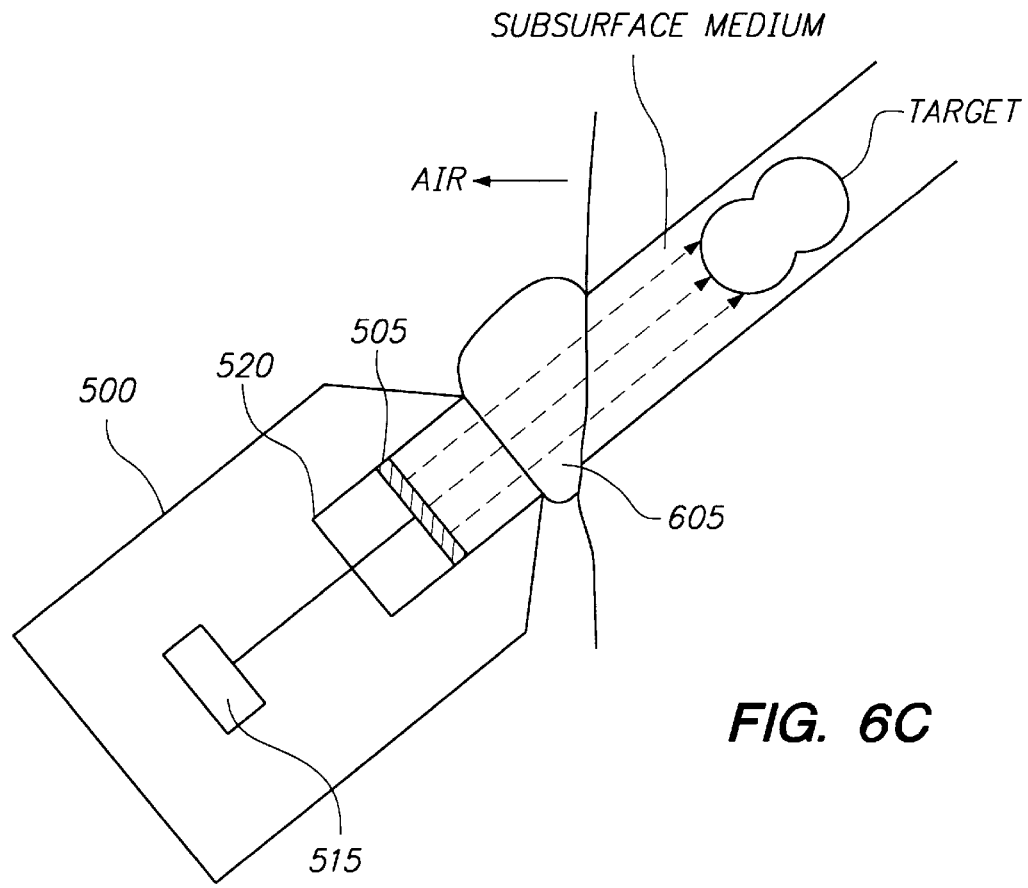
Figure 6D:
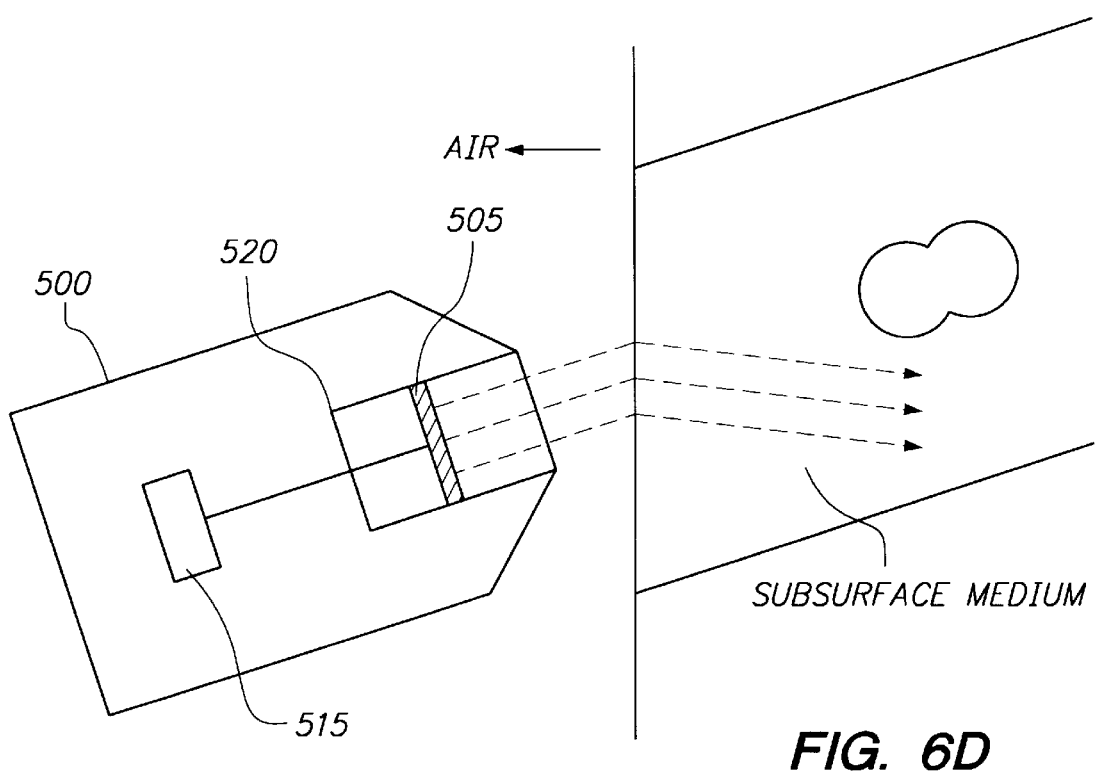

The bladder 605, assuming it exhibits a dielectric constant that is equal or substantially equal to the dielectric constant of the subsurface medium, also improves the user's ability to control the direction of propagation of the radio frequency energy, as illustrated by FIGS. 6C and 6D. That is because the radio frequency energy traversing the interface between the bladder 605 and the subsurface medium experiences little or no refraction, for the reasons presented above. The ability to control the direction of propagation is especially important where the user is likely to aim the GPR 500 such that the antenna boresight is not perpendicular to the surface. The user may want to aim the GPR in this manner in an attempt to align the antenna boresight with the subsurface medium vein which is believed to be running along a path that is not perpendicular to the surface, as illustrated in both FIGS. 6C and 6D. FIG. 6C is intended to illustrate how the bladder 605 permits the user to direct the radio frequency energy straight into the subsurface medium and along the antenna boresight, despite the fact that the antenna boresight is not perpendicular to the surface. In contrast, FIG. 6D illustrates that without the bladder, the user may have more difficulty directing the radio frequency energy along a desired subsurface path as the radio frequency energy is likely to experience some level of refraction as it traverses the surface between the air and the subsurface medium.

The present invention provides a number of advantages over prior conventional GPR systems. First, the synthetic aperture, end-fire array technique employed by the present invention makes it unnecessary to precompute the propagation characteristics for each region within the subsurface volume. This, in turn, results in relatively simple signal processing routines. Therefore, on-boresight, A-scan images of subsurface targets are achieved in real-time with a relatively limited amount of computation. Second, the present invention provides for effectively narrow beamwidths, which are otherwise difficult to achieve with UWB impulses. Third, the antenna beam-forming requirements are minimal, further facilitating a compact design to support the inventions use in a spatially constrained environment. Fourth, an alternative embodiment that immerses the antenna in a fluid, and which optionally includes a flexible bladder, wherein the fluid and the bladder preferably have a dielectric constant that is equal to or substantially equal to the dielectric constant of the subsurface medium, reduces energy losses that may otherwise occur as the radio frequency energy propagates from the antenna into the subsurface medium, and enhances the effective power of the radio frequency energy.

What is claimed is:

1. A radar system for detecting targets embedded in a subsurface medium comprising:

an antenna assembly;

an antenna chamber, wherein said antenna assembly is enclosed within said antenna chamber;

means for translating the antenna assembly along a boresight axis within said antenna chamber; and a fluid, wherein said fluid is enclosed in said antenna chamber such that said antenna assembly remains immersed in said fluid as the antenna assembly is translated along the boresight axis within the antenna chamber, and wherein said fluid has a dielectric constant that matches a dielectric constant associated with the subsurface medium.

2. The radar system of claim 1 further comprising:

means for translating the antenna assembly along a boresight axis within said antenna chamber.

3. The radar system of claim 1, wherein said radar system transmits and receives radio frequency energy to and from a subsurface medium, and where said fluid has a dielectric constant that is equal to a dielectric constant associated with the subsurface medium.

4. The radar system of claim 1, wherein said radar system transmits and receives radio frequency energy to and from a subsurface medium, and wherein said fluid has a dielectric constant that is substantially equal to a dielectric constant associated with the subsurface medium.

5. The radar system of claim 4, wherein the dielectric constant of the fluid more closely approximates the dielectric constant associated with the subsurface medium as compared to a dielectric constant associated with air.

6. The radar system of claim 1 further comprising:
means for removing said fluid; and
means for filling said antenna chamber with a replacement fluid, said fluid having a dielectric constant that differs from a dielectric constant associated with said replacement fluid.

7. The radar system of claim 1 further comprising:
a bladder coupled to a front end of said antenna chamber, such that said bladder displaces air between said antenna chamber and the subsurface medium.

8. The radar system of claim 7, wherein said bladder comprises:
a flexible material capable of conforming to a surface area contour of the subsurface medium.

9. The radar system of claim 8, wherein said flexible material has a dielectric constant that is equal or substantially equal to a dielectric constant associated with the fluid and a dielectric constant associated with the subsurface medium.

10. The radar system of claim 7, wherein said bladder is filled with a fluid having a dielectric constant that is equal or substantially equal to a dielectric constant associated with the fluid and a dielectric constant associated with the subsurface medium.

11. An apparatus for transmitting and receiving ground penetrating radar signals into and out of a subsurface medium comprising:
antenna means for transmitting and receiving radio frequency energy at a plurality of points along a boresight axis;
antenna repositioning means for translating said antenna means to each of the plurality of points along the boresight axis; and
means for keeping said antenna means immersed in a fluid as said antenna means transmits and receives radio frequency energy at each of the plurality of points along the boresight axis, wherein said fluid has a dielectric constant that matches a dielectric constant associated with the subsurface medium.

12. The apparatus of claim 11, wherein the fluid has a dielectric constant equal or substantially equal to a dielectric constant associated with the subsurface medium.

13. The apparatus of claim 11 further comprising:
means for replacing the fluid with an alternative fluid, wherein the fluid has a dielectric constant that differs from a dielectric constant associated with the alternative fluid.

14. The apparatus of claim 11 further comprising:
means for displacing air located between said means for keeping said antenna means immersed in fluid and the subsurface medium.

15. The apparatus of claim 14, wherein said means for displacing air is a bladder.

16. The apparatus of claim 15, wherein a dielectric constant associated with the bladder is equal or substantially equal to a dielectric constant associated with the fluid and a dielectric constant associated with the subsurface medium.

17. An apparatus for transmitting and receiving ground penetrating radar signals into and out of a subsurface medium comprising:
an antenna chamber;
antenna means for transmitting and receiving radio frequency energy at a plurality of points along a boresight axis within said antenna chamber;
antenna repositioning means for translating said antenna means to each of the plurality of points along the boresight axis; and
means for displacing air located between said antenna chamber means and the subsurface medium with a fluid that has a dielectric constant that matches a dielectric constant of the subsurface medium, as said antenna means transmits and receives radio frequency energy at each of the plurality of points along the boresight axis.

18. The apparatus of claim 17, wherein said means for displacing air is a bladder.

19. The apparatus of claim 18, wherein said bladder is comprised of a flexible material having a dielectric constant equal or substantially equal to a dielectric constant associated with the subsurface medium.

20. The apparatus of claim 18, wherein said bladder is filled with a fluid having a dielectric constant equal or substantially equal to a dielectric constant associated with the subsurface medium.

21. A method for illuminating potential subsurface targets embedded in a subsurface medium comprising the steps of:
immersing an antenna in a fluid, wherein the fluid has a dielectric constant that is equal or substantially equal to a dielectric constant associated with the subsurface medium;
translating the antenna to each of a plurality of points along a boresight axis of the antenna, wherein the antenna remains immersed in the fluid; and
transmitting and receiving radio frequency energy at the plurality of points along the boresight axis, wherein the radio frequency energy is transmitted from the antenna into the fluid and then into the subsurface medium, and wherein the radio frequency energy is reflected by the target, if one exists, through the subsurface medium and into the fluid.

22. The method of claim 21, wherein said step of transmitting and receiving radio frequency energy at the plurality of points along the boresight axis comprises the steps of:
transmitting the radio frequency energy through the fluid into a bladder and then into the subsurface medium; and
receiving the radio frequency energy reflected back by the target, if one exists, through the subsurface medium, into the bladder, and then into the fluid.

23. The method of claim 22, wherein a dielectric constant associated with the bladder is equal or substantially equal to a dielectric constant associated with the fluid and a dielectric constant associated with the subsurface medium.

* * * * *